United States Patent
Hall

(10) Patent No.: US 6,487,049 B1
(45) Date of Patent: Nov. 26, 2002

(54) DRIVE HEADS FOR STORAGE MEDIA DRIVE WITH DISPLACED PAIR OF SENSORS

(75) Inventor: David Hall, Salt Lake City, UT (US)

(73) Assignee: Iomega Corporation, Roy, UT (US)

(*) Notice: Subject to any disclaimer, the term of this patent is extended or adjusted under 35 U.S.C. 154(b) by 0 days.

(21) Appl. No.: 09/219,026

(22) Filed: Dec. 23, 1998

(51) Int. Cl.$^7$ .................................................. G11B 5/48
(52) U.S. Cl. .................................................. 360/246.8
(58) Field of Search .......................... 360/246.2, 246.6, 360/246.7, 246.8, 103, 104, 105, 125, 126, 236.2, 235.4, 235.6, 235.7, 235.9, 236.4, 236.8, 236.9, 234.3, 234.7, 234.8, 234.9, 236.7, 237, 236.3, 264.1, 236.1

(56) References Cited

U.S. PATENT DOCUMENTS

| | | | | |
|---|---|---|---|---|
| 4,802,042 A | * | 1/1989 | Strom ...................... | 360/234.8 |
| 5,231,554 A | * | 7/1993 | Goto et al. .............. | 360/236.3 |
| 5,400,199 A | * | 3/1995 | Sano et al. .............. | 360/234.7 |
| 5,650,893 A | * | 7/1997 | Bolasna et al. .......... | 360/236.1 |
| 5,724,212 A | * | 3/1998 | Mallary et al. .......... | 360/264.1 |
| 5,771,134 A | * | 6/1998 | Kurita et al. ............ | 360/234.8 |
| 5,793,570 A | * | 8/1998 | Osaka ...................... | 360/246.8 |
| 5,796,551 A | * | 8/1998 | Samuelson et al. ...... | 360/236.8 |
| 5,825,588 A | * | 10/1998 | Bolasna et al. .......... | 360/236.2 |
| 5,870,250 A | * | 2/1999 | Bolasna et al. .......... | 360/236.8 |
| 5,917,678 A | * | 6/1999 | Ito et al. .................. | 360/235.4 |
| 5,973,880 A | * | 10/1999 | Hashimoto et al. ...... | 360/236.2 |
| 6,021,020 A | * | 2/2000 | Ito et al. .................. | 360/236.1 |

\* cited by examiner

*Primary Examiner*—Hoa T. Nguyen
*Assistant Examiner*—Tianjie Chen
(74) *Attorney, Agent, or Firm*—Woodcock Washburn LLP

(57) ABSTRACT

A pair of opposing drive heads are positioned in a storage media drive to read and/or write a storage media interposed therebetween. Each drive head has a sensor face that includes first and second parallel longitudinally extending air-bearing surfaces. Each air-bearing surface has generally longitudinally opposing leading and trailing terminations. The storage media travels adjacent the sensor face in a traveling direction extending along the air-bearing surfaces from the leading to the trailing terminations. A drive sensor is positioned on the first air-bearing surface a distance D1 from the trailing termination thereof. The trailing termination of the second air-bearing surface extends farther a distance D2 in the traveling direction than the trailing termination of the first air-bearing surface. The drive heads are opposingly positioned such that each first air-bearing surface is opposed by the second air-bearing surface of the opposite drive head, and such that the leading and trailing terminations of the drive heads oppose each other. Each drive sensor is overlaid by the second air-bearing surface of the opposite drive head when the drive heads are aligned with respect to the traveling direction. Each drive sensor remains overlaid by such second air-bearing surface when the drive heads are mis-aligned with respect to the traveling direction by as much as the sum of D1 and D2.

30 Claims, 6 Drawing Sheets

DRIVE HEADS FOR STORAGE MEDIA DRIVE WITH DISPLACED PAIR OF SENSORS

FIELD OF THE INVENTION

The present invention relates to a pair of drive heads for a storage media drive. More particularly, the present invention relates to a pair of opposing drive heads for being positioned in a storage media drive to read a flexible storage media positioned within such drive.

BACKGROUND OF THE INVENTION

In a typical storage media drive, a storage media is passed by a drive head such that the drive head can read information from and/or write information to the storage media. Particularly where the storage media is a two-sided disk or other similar object, the information may be stored on both sides thereof. Accordingly, the typical drive includes a pair of opposing drive heads, and the storage media travels between such opposing drive heads. Of course, in the situation where a drive includes multiple media such as multiple disks (usually stacked on a single spindle), each disk travels between its own pair of drive heads.

When the storage media is a disk, to facilitate the reading and/or writing operations of the storage media drive, the storage media is rotated at an angular speed high enough to cause each drive head to 'ride up' onto an air bearing formed between the face of the drive head and the surface of the rotating storage media. As should be understood, the air bearing is a formed cushion of air that facilitates smoother operation of the storage media drive, and also prevents unnecessary wear on the storage media that would otherwise be caused by the contact of the drive heads on the rotating storage media. Of course, some contact is normal, especially in connection with a flexible storage media.

In one typical embodiment of the opposing drive heads, each drive head has a pair of longitudinally extending generally parallel raised rails, where the surface of each raised rail includes a longitudinally extending air bearing surface. As should be understood, the air bearing surface on each rail is the substantially flat portion thereof that directly faces the storage media, and that most contributes to the maintenance of the created air bearing. A drive sensor is positioned on a first one of the air bearing surfaces of each drive head, and the drive heads are positioned to oppose each other such that the drive sensor on each drive head is opposed by the second one of the air bearing surfaces of the other drive head (i.e., the air bearing surface that does not have the drive sensor). By being so opposed, the storage media will travel adjacent each drive sensor in close proximity to such drive sensors.

However, if the storage media is relatively flexible, as can be the case, and should the drive heads become mis-aligned such that one of the drive sensors becomes unopposed, the flexible storage media will not travel adjacent each drive sensor in close proximity to such drive sensors. In particular, and as should be understood, a rotating, generally flexible storage media rotating past an un-opposed air bearing surface tends to curve away therefrom. If such un-opposed air bearing surface should include a drive sensor, it is likely the case that the curved-away storage media is too far from such drive sensor to allow such drive sensor to read to or write from such drive media.

To complicate matters, in a typical drive head, the drive sensor is positioned toward the trailing termination of the air bearing surface on which it resides, and in some instances can even be positioned at such trailing termination. As may be understood, the amount of mis-alignment that can be tolerated decreases as the drive sensor gets closer to the trailing termination. At the trailing termination, then, practically any mis-alignment will result in one of the drive sensors being unopposed by an air bearing surface.

Accordingly, a need exists for a pair of opposing drive heads in a storage media drive wherein mis-alignment of the drive heads can be better tolerated, even if the drive sensors are positioned at the trailing terminations of respective air bearing surfaces.

SUMMARY OF THE INVENTION

The present invention satisfies the aforementioned needs by providing a pair of opposing drive heads for being positioned in a storage media drive to read and/or write a storage media that is interposed between the drive heads for travel therebetween. Each drive head has a sensor face that includes first and second generally parallel longitudinally extending air-bearing surfaces. Each air-bearing surface has a leading termination and a generally longitudinally opposing trailing termination. The storage media travels adjacent the sensor face of the drive head in a traveling direction extending generally along the air-bearing surfaces from the leading terminations to the trailing terminations.

A drive sensor is positioned on the first air-bearing surface of the sensor face a distance D1 from the trailing termination of such first air-bearing surface. The trailing termination of the second air-bearing surface of each drive head extends farther a distance D2 in the traveling direction than the trailing termination of the first air-bearing surface of each drive head. The drive heads are opposingly positioned with respect to each other such that the first air-bearing surface of each drive head is generally opposed by the second air-bearing surface of the opposite drive head, such that the leading terminations of the drive heads generally oppose each other, and such that the trailing terminations of the drive heads generally oppose each other.

The drive sensor of each drive head is overlaid by the second air-bearing surface of the opposite drive head when the drive heads are aligned with respect to the traveling direction. The drive sensor of each drive head remains overlaid by the second air-bearing surface of the opposite drive head when the drive heads are mis-aligned with respect to the traveling direction by as much as the sum of D1 and D2.

BRIEF DESCRIPTION OF THE DRAWINGS

The foregoing summary as well as the following detailed description of the present invention will be better understood when read in conjunction with the appended drawings. It should be understood, however, that the invention is not limited to the precise arrangements and instrumentalities shown. In the drawings.

DETAILED DESCRIPTION OF THE PREFERRED EMBODIMENT

Figure 1:
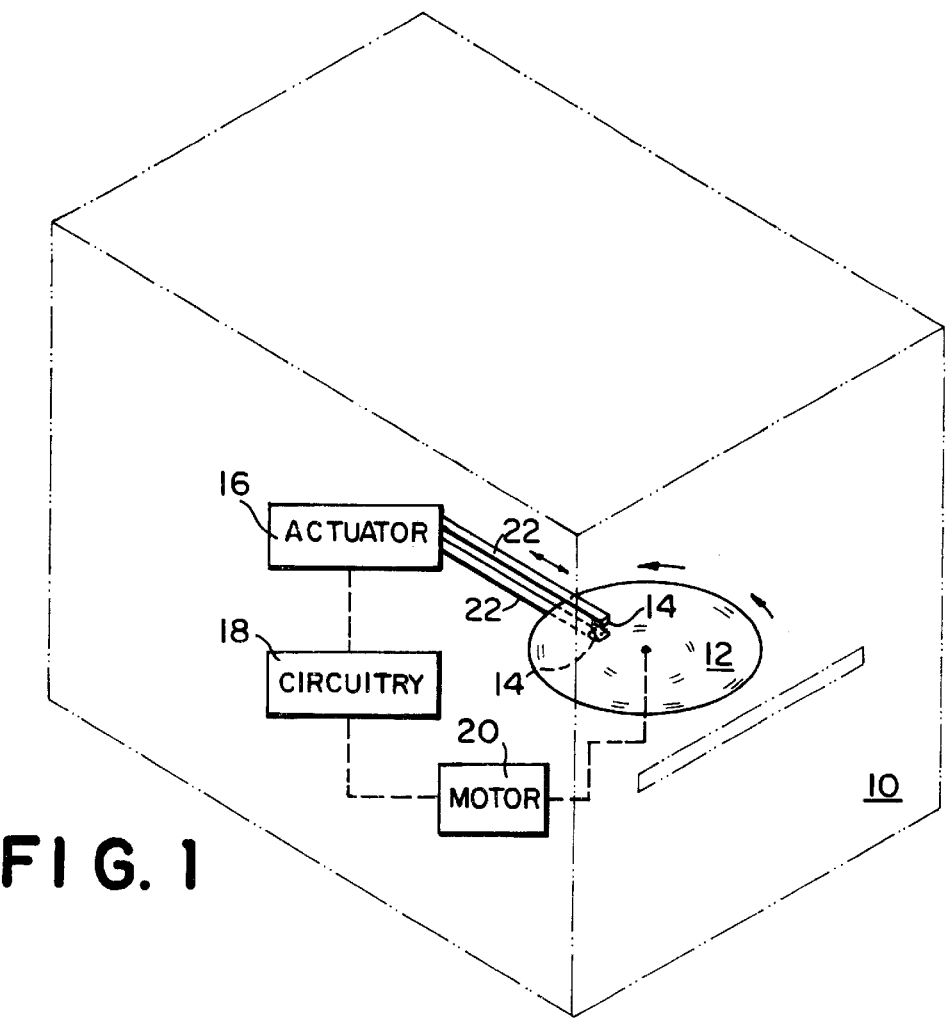
FIG. 1 is a perspective view of a storage media drive in accordance with one embodiment of the present invention.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

Referring to the drawings in detail wherein like numerals are used to indicate like elements throughout, there is shown in FIG. 1 a storage media drive 10 in accordance with one embodiment of the present invention. The drive 10 is for reading from and/or writing to a storage media 12, as is shown. In one embodiment of the present invention, the media 12 is a flexible or "floppy" disk or the like, which may be encased within an appropriate cartridge (not shown), and which is removably insertable into the drive 10. Examples of such flexible disk media 12 include known 3.5" and 5.25" floppy disks, IOMEGA ZIP disks, which are manufactured and marketed by IOMEGA Corporation of Roy, Utah, and the like. However, the media 12 may be any media without departing from the spirit and scope of the present invention. For example, the media 12 may be a magnetic floppy disk, an optical floppy disk, or even flexible magnetic or optical storage tape. In addition, the media 12 may be fixedly positioned within the drive 10, if so desired.

The drive 10 also includes an appropriate motor 20 to rotate or move the media 12. The motor 20 is typically coaxial with the media 12 and directly drives such media 12 by way of an appropriate spindle interacting with a hub in such media 12. However, the motor may also be non-coaxial and indirectly drive the media 12 by way of gears or the like (not shown). The motor 20 may be any appropriate motor without departing from the spirit and scope of the present invention. The details of such motor 20 and its operational characteristics are not especially relevant to the present invention, and therefore are not described further herein.

As shown in FIG. 1, the drive 10 has a pair of opposing drive heads 14 for reading from and/or writing to the media 12. As will be discussed below, the drive heads 14 shown in FIGS. 2 and 3 are prior art drive heads 14, while the drive heads shown in FIGS. 5–8 are drive heads in accordance with embodiments of the present invention. In any case, the opposing drive heads 14 are in intimate relationship with the media 12, with one drive head 14 on either side of such media 12. Each drive head 14 can read from and/or write to an information layer on the respective side of the media 12. The manner of such reading and/or writing is known, and therefore need not be described here in any significant further detail. Although it may be possible for both drive heads 14 to function simultaneously, it is almost always (if not always) the case that only one drive head 14 functions at any one time. As should be understood, the aforementioned intimate relationship is necessary to effectuate the transferring of data between the media 12 and the drive heads 14 as the motor 20 rotates the media 12 past the drive heads 14, especially where individual pieces of such data are organized on the media 12 in exceedingly small spaces.

Despite the need for such intimate relationship, the drive heads 14 preferably avoid direct contact with the rotating media 12 as much as is possible, since such direct contact could damage the drive heads 14 and/or the media 12. However, in many instances, such as where the media 12 is flexible, such direct contact is unavoidable, and is in fact substantially continuous. In such instances, measures (discussed below) are preferably employed to minimize contact friction.

As should be appreciated, each drive head 14 is typically supported by a load beam 22, as is seen in FIGS. 1 and 2. Preferably, each drive head 14 is flexibly attached to its respective load beam 22 such that the drive head can orient itself into the aforementioned intimate relationship with the surface of the media 12. Any appropriate means for such attachment may be employed without departing from the spirit and scope of the present invention. For example, a flexure rotating over a dimple (i.e., a gimbal mount) (not shown) may be employed.

In addition to the drive heads 14 and the motor 20, the drive 10 typically has an actuator 16 (FIG. 1) for actuating movement of the drive heads 14 with respect to the media 12. As should be understood, especially with regard to rotating media 12, such actuator 16 positions the drive heads 14 in a radial manner with respect to such media 12 so that the drive heads 14 can read from and/or write to particular radially organized tracks of data (not shown) or to a helical track of data (not shown) on the rotating media 12. The actuator 16 may move the drive heads 14 linearly, either along a radial line of the media 12 or at an angle to such a radial line, or may move the drive heads 14 about a pivot point exterior to the media 12, among other modes of operation. Typically, and as should be understood, the actuator 16 actuates the drive heads 14 by way of the load beams 22. The details of such actuator 16 are not especially relevant to the present invention and therefore are not described further herein. Any appropriate actuator 16 may therefore be employed without departing from the spirit and scope of the present invention.

As also seen in FIG. 1, the drive 10 includes appropriate circuitry 18 for facilitating the aforementioned reading and/or writing by the drive heads 14. Such circuitry 18 operates the drive heads 14, actuator 16, and motor 20, and also facilitates transfers of information between the media 12 and a selected external entity (not shown) in response to a request for such information from such external entity, among other things. The external entity, as can be appreciated, is typically a computer or other similar device having a processor and memory, although any appropriate external entity may be employed without departing from the spirit and scope of the present invention. As before, the details of the circuitry 18 are not especially relevant to the present invention, and therefore are not described further herein. Any appropriate circuitry 18 may be employed without departing from the spirit and scope of the present invention.

As should be understood, and especially in the case where the storage media 12 is a disk, the drive 10 may in fact have several disks, typically mounted at different axial heights on a single spindle (not shown). In such a situation, and as is known, each disk typically has its own pair of drive heads 14.

Referring now to FIGS. 2 and 3, it is seen that a typical one of the prior art drive heads 14 has a sensor face 24 that faces generally toward the media 12 and also toward the opposing drive head 14 (not shown in FIG. 3). As particularly seen in FIG. 3, the sensor face 24 includes first and second generally parallel longitudinally extending air bearing surfaces 26a, 26b. Each air bearing surface 26a, 26b has a leading termination 26l at one longitudinal end thereof and a generally longitudinally opposing trailing termination 26t at the other longitudinal end thereof. As should be understood, the storage media 12 typically travels adjacent the sensor face 24 of the drive head 14 in a traveling direction T (as shown in FIGS. 2 and 3) that extends generally along the air bearing surfaces 26a, 26b from the respective leading terminations 26l to the respective trailing terminations 26t. Such traveling direction T may be generally parallel to the air bearing surfaces 26a, 26b, or may be at a relatively small angle with respect to the air bearing surfaces 26a, 26b. If such angle becomes too large, an air bearing will not be formed between the sensor face 24 of the drive head 14 and the surface of the rotating storage media 12, as will be explained below.

Still referring to FIG. 3, the sensor face 24 typically includes additional elements in conjunction with the first and second air bearing surfaces 26a, 26b. In particular, each air bearing surface 26a, 26b on each sensor face 24 of each drive head 14 is the top surface of a raised rail 28 on such sensor face 24. Accordingly, each air bearing surface 26a, 26b is set off from the sensor face 24 a short distance on the order of at least a few micrometers. Preferably, the air bearing surfaces 26a, 26b are coplanar to within tens of nanometers. As extensions to the raised rails 28, the sensor face 24 of each drive head 14 further includes bevels 30 that extend from the air bearing surfaces 26a, 26b in one or both longitudinal directions.

The bevel 30 extending from the leading termination 26l of each air bearing surface 26a, 26b typically has a very gentle grade, on the order of one or perhaps a half degree to one degree or so, and extends over a relatively long distance, perhaps 400 micrometers or so. Accordingly, and as should be understood, the leading bevel 30 contributes to the formation of the air bearing effect when the media 12 is rotated past the drive head 14. In particular, the gentle grade of the leading bevel 30 tends to trap or entrain air moved toward the drive head 14 by the rotating media 12, and to insert the trapped air between the air bearing surfaces 26a, 26b and the surface of the media 12. If the traveling direction T is at too large an angle with respect to the air bearing surfaces 26a, 26b, each leading bevel 30 will not trap air and an air bearing will not be formed thereby. The bevel 30 extending from the trailing termination 26t of each air bearing surfaces 26a, 26b need not be as gentle as the leading bevel 30, and may in fact be much steeper than the leading bevel 30, on the order of 10 to 30 degrees or so, and may extend over a relatively short distance, perhaps 50 micrometers or so. Accordingly, and as should be likewise understood, the trailing bevel 30 quickly dissipates the trapped air and therefore dissipates the air bearing formed thereby.

As was alluded to above, in the instance where the media 12 is flexible, actual 'riding up' onto an air cushion formed by the air bearing surfaces 26a, 26b is prevented, and direct contact between the drive heads 14 and media 12 is encountered. Generally, the flexible media 12 does not spin flat, and vibrations caused thereby disrupt the ability to 'ride up'. Nevertheless, in such instance, the air bearing surfaces 26a, 26b 'iron out' the flexible media, and also act to minimize contact friction with such media 12 and drive heads 14.

Preferably, each bevel 30 interconnects to a respective air bearing surface 26a, 26b on the rails 28 at a blend 32 adjacent to or coextensive with a respective termination 26l, 26t of such air bearings 26a, 26b. As should be understood, such blends 32 reduce any (microscopically) sharp surfaces that may otherwise come in contact with and injure the media 12. The blends 32 at the leading terminations 26l also contribute to smoothly transitioning into the created air bearings, and the blends 32 at the trailing terminations 26t likewise contribute to smoothly dissipating the air bearings. Other blends (not shown) may also be employed at any other (microscopically) sharp surfaces that may otherwise come in contact with and injure the media 12. For example, such other blends may be employed at the transverse sides of the air bearing surfaces 26a, 26b.

Although particular arrangements of air bearing surfaces 26a, 26b, rails 28, bevels 30 and blends 32 on the sensor face 24 of each drive head 14 are shown and discussed in the present disclosure, it will be recognized that other arrangements may be employed without departing from the spirit and scope of the present invention. For example, other types of bevels 30 and blends 32 may be employed, and some bevels 30 and/or blends 32 may even be removed. Moreover, although each rail 28 is shown as being continuous and uninterrupted, it should be understood that one or more interrupting cross-slots 33 may be placed in the raised rails 28 without departing from the spirit and scope of the present invention. As is known, such interrupting cross-slots can be useful in forming, regulating, and/or maintaining air bearings. Although such cross-slots interrupt the longitudinal air bearing surfaces 26a, 26b, such interruptions should be overlooked for purposes of defining the air bearing surfaces 26a, 26b and the leading and trailing terminations 26l, 26t thereof in connection with the present invention.

As should be understood, each drive head 14 is typically a unitary body machined from a block of material such as a zirconia or the like. However, other appropriate materials and other appropriate methods of formation may be employed without departing from the spirit and scope of the present invention. In many instances, the drive head 14 is formed at least initially as one of many drive heads 14 organized and machined into a block of material in the form of rows and columns therein. The rows and columns of drive heads 14 are then appropriately separated into individual elements for further processing and finishing operations.

Still referring to FIG. 3, it is seen that a drive sensor 34 is positioned on the first air bearing surface 26a of each sensor face 24 a distance D1 from the trailing termination 26t of such first air bearing surface 26a. As should be understood, such drive sensor 34 is positioned on such first air bearing surface 26a such that the sensor is flush with such air bearing surface 26a and does not significantly disturb the air bearing formed thereby, and such that full advantage is taken of such formed air bearing. Typically, and referring now to FIG. 4, the drive sensor 34 is a magnetic drive sensor and is in actuality the upper-most portion of a glass gap in an iron core 36 that is positioned within a longitudinally and vertically extending slot 37 (FIGS. 2 and 3) in the drive head 14. As should be understood, such slot 37 extends longitudinally and vertically into the first air bearing surface 26a and also through any trailing bevel 30 and blend 32 adjacent thereto.

Figure 4:
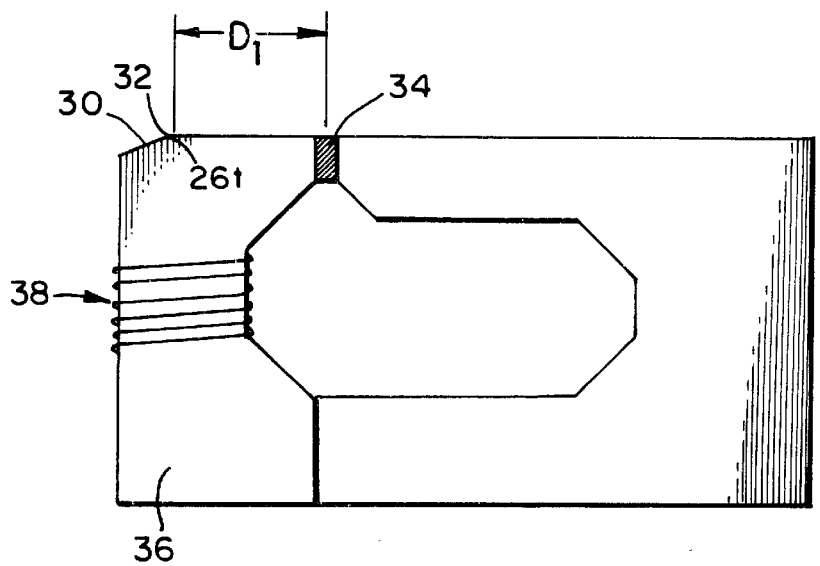
FIG. 4 is a side view of an iron core of the drive head of FIG. 3.

Still referring to FIG. 4, it is seen that the iron core 36 includes a winding 38. As should be understood, data is magnetically written onto a magnetic storage media 12 by flowing current through the winding 38 in a predetermined manner to create magnetic flux in the core 36 and in particular at the gap/drive sensor 34. Such flux alters the magnetic orientation of magnetic particles on the side of the media 12 adjacent the gap/drive sensor 34 as the media 12 rotates past such gap/drive sensor 34. Correspondingly, written data on the media 12 is magnetically read therefrom by sensing the magnetic orientation of magnetic particles on the side of the media 12 adjacent the gap/drive sensor 34 as the media 12 rotates past such gap/drive sensor 34. In particular, changes in the magnetic orientation of such magnetic particles change the flux present at the gap/drive sensor 34 as the media 12 rotates there-past, and such changes are made to appear as changing voltages at the winding 38. The design, manufacturing, and operation of iron gap cores 36 is generally known, and therefore need not be further described here in any significant manner. Any appropriate core 36 or other like device may be employed to instantiate the drive sensor 34 without departing from the spirit and scope of the present invention. For example, instead of a core, certain thin film sensors or magneto-resistive sensors may be employed. It should be noted that while the core 36 shown in FIG. 4 is applicable for magnetic-based media 12, other appropriate devices may be necessary for non-magnetic-based media 12, such as optical-based media 12 or the like.

Referring still to FIGS. 3 and 4, it is seen that the magnetic core 36 includes a trailing bevel and blend 30, 32 and a first air bearing surface 26a. The magnetic core 36 is therefore inserted into the head 14 and is retained in head 14 such that the core 36 forms a portion of the first air bearing surface 26a and trailing bevel and blend 30, 32 extending from the first air bearing surface 26a. Typically, the core 36 is glass-mounted into the longitudinal slot 37 in the head 14 by known techniques. The slot 37 must be substantially completely filled by the core 36 and the mounting glass in the region of the air bearing surface 26a.

Typically, the winding 38 is an insulated conductor such as lacquered copper or the like that is passed several times through the center of the core 36 after the core 36 has been mounted to the drive head 14. To facilitate such passing through, each drive head 14 typically includes a diagonally and horizontally extending slot 39 (shown in FIG. 2, not shown in FIG. 3 for the sake of clarity) that intersects with the slot 37 and with the center of the core 36 as the core is mounted in the slot 37. As should be understood, then such slot 39 extends diagonally and horizontally under the sensor face 24 of the drive head 14, such that access to the center of the mounted core 36 may be had. A needle threaded with the insulated conductor, or the like, may be employed to pass the insulated conductor through the center of the core 36 several times by way of the slot 39 to form the winding 38.

Of course, other methods of and materials for mounting the core 36, and other methods of placing the winding 38 on the core 36, may be employed without departing from the spirit and scope of the present invention. Moreover, rather than mounting a distinctly formed core 36 into the drive head 14 and forming the winding 38 by passing a conductor around the core several times, the core 36, the drive sensor 34 thereon, and/or the winding 38 may instead be formed with the drive head 14 by way of deposition technology or another forming technology. As is known, in such deposition technology, layers of material are selectively deposited in a pre-determined step-by-step process to build the head 14. Such deposition technology may for example include the use of multiple masks, etching, sputtering of material, other depositions, etc. If deposition technology is in fact employed, slot 37 and/or slot 39 may not be necessary.

Referring again to FIG. 2, it is seen that in any embodiment, the drive heads 14 are opposingly positioned with respect to each other such that the first air bearing surface 26a of each drive head 14 (which has the drive sensor 34) is generally opposed by the second air bearing surface 26b of the opposite drive head 14 (which does not have a drive sensor 34). In addition, the leading terminations 26l of the drive heads 14 are generally opposite each other and the trailing terminations 26t of such read heads 14 are also generally opposite each other. As should be understood, the drive heads 14 in any particular drive 10 are substantially identical to each other and are oriented substantially identically with respect to the traveling direction T, although one drive head 14 is rotated 180 degrees about an axis in the traveling direction T with respect to the other drive head 14. Accordingly, the sensor faces 24 of such drive heads 14 face each other, and the first air bearing surfaces 26a face the respective second air bearing surfaces 26b, as was discussed above.

As can be seen in FIGS. 2 and 3, in prior art drive heads 14, with respect to any single drive head 14, neither of the trailing terminations 26t of the first and second air bearing surfaces 26a, 26b extends farther in the traveling direction T than the other trailing termination 26t (i.e., both trailing terminations 26t on any drive head 14 are 'even').

Figure 2A:
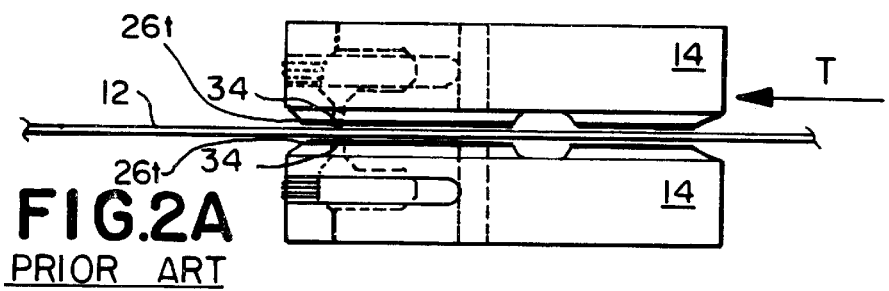
FIGS. 2A and 2B are un-exploded side views of the drive heads of FIG. 2, and show the drive heads in alignment (FIG. 2A) and in mis-alignment (FIG. 2B)
Figure 2B:
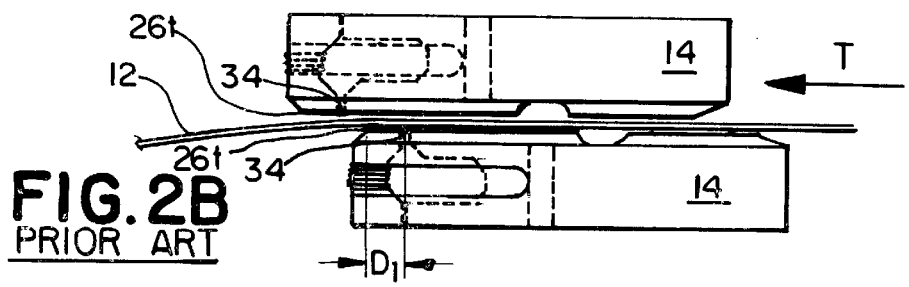
Figure 2:
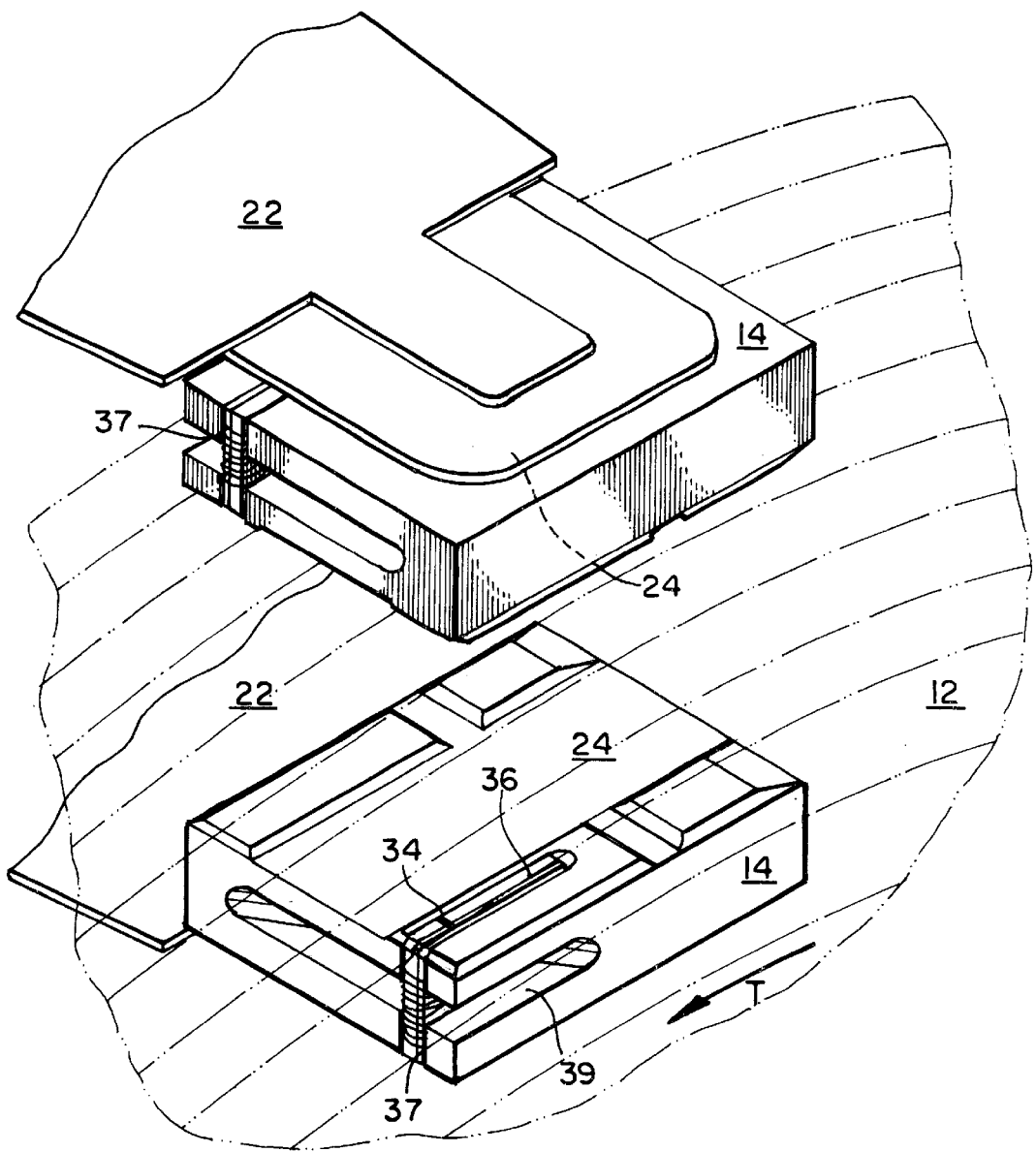
FIG. 2 is an exploded perspective view of a prior art pair of drive heads for use in the storage media drive of FIG. 1.
Figure 3:
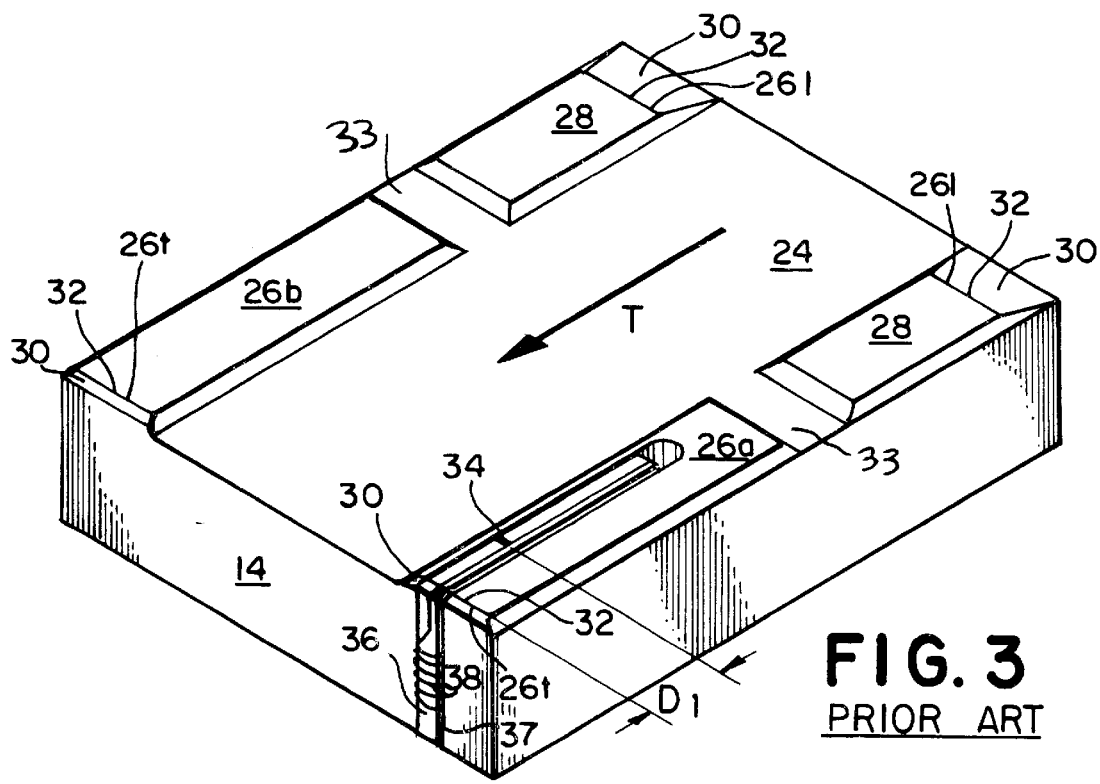
FIG. 3 is a perspective view of one of the prior art drive heads of FIG. 2.

Referring now to FIG. 2A, it is seen that when the prior art drive heads 14 of FIG. 2 are oriented with respect to each other such that each first air bearing surface 26a generally faces its opposing second air bearing surfaces 26b, and when the drive heads 14 are aligned with respect to the traveling direction T such that neither of the trailing terminations 26t of the first air bearing surfaces 26a extends farther in the traveling direction T than the other trailing termination 26t on the other first air bearing surface 26a (i.e., when the trailing terminations 26t of the first air bearing surfaces 26a are 'even'), then each drive sensor 34 on each first air bearing surface 26a is overlaid by the respective second air bearing surface 26b of the opposite drive head 14.

Importantly, though, and referring now to FIG. 2B, if the prior art drive heads 14 of FIG. 2 become mis-aligned with respect to the traveling direction T such that one of the trailing terminations 26t of the first air bearing surfaces 26a extends farther in the traveling direction T than the other trailing termination 26t on the other first air bearing surface 26a (i.e., when the trailing terminations 26t of the first air bearing surfaces 26a are 'uneven'), then the situation may arise where the drive sensor 34 on one of the first air bearing surfaces 26a is not opposed by its respective second air bearing surface 26b on the opposite drive head 14. In such a situation, and as shown in FIG. 2B, it should be understood that a relatively flexible media 12 will tend to curve away from the un-opposed drive sensor 34, with the result being that the media 12 is far enough away from such un-opposed drive sensor 34 (i.e., more than about 0.05 micrometers) such that the un-opposed drive sensor 34 cannot read from and/or write to such media 12 (i.e., can result in loss of linkage).

It should be understood that mis-alignment in the traveling direction T as between the drive heads 14 occurs because of the flexibility of each drive head 14 with respect to its load beam 22. As was discussed above, such flexibility is desirable since it allows each drive head 14 to assume an appropriate intimate relationship with the surface of the media 12. However, and as discussed above, such flexibility can also result in the aforementioned mis-alignment.

As should be understood from FIG. 2B, the critical distance for mis-alignment in the traveling direction T is the distance D1 on a particular one of the drive heads 14 between the drive sensor 34 of such drive head 14 and the trailing termination 26*t* of the drive head 14 on the first air bearing surface 26*a* thereof. If, for the prior art drive heads 14 shown in FIGS. 2, 2A, and 2B, the mis-alignment in the traveling direction T is less than the distance D1, then both drive sensors 34 will remain opposed by second air bearing surfaces 26*b*. Correspondingly, if the mis-alignment is greater than D1, at least one of the drive sensors 34 will become un-opposed, the media 12 will curve away from such sensor 34, and loss of linkage between the media 12 and the sensor(s) 34 will occur.

The problem of trailing termination mis-alignment as discussed above can be alleviated by ensuring that the distance D1 between each drive sensor 34 and its respective trailing termination 26*t* is maintained at a reasonable amount. Importantly, though, other factors mitigate against maintaining such a reasonable distance D1. For one thing, and with respect to the gap/drive sensor 34 of the iron core 36 of FIG. 4, it is known that such gap/drive sensor 34 is preferably as close to the winding 38 as possible (i.e., as close to the trailing termination 26*t* as possible), since doing so improves the information transfer characteristics between the gap/drive sensor 34 and the winding 38. For another thing, and in the case where deposition technology is employed to depose the core 36 and the drive sensor 34 onto each drive head 14, as was discussed above, the mechanics of such deposition technology make it preferable if not required that the drive sensor 34 be positioned immediately at or almost adjacent to the trailing termination 26*t*. In any case, the distance D1 typically ranges from about 0 to about 9 thousandths of an inch in a typical drive head 14. Accordingly, with such a small distance D1, even slight mis-alignments of the drive heads 14 in the traveling direction T can result in an un-opposed drive sensor 34, media curvature, and loss of linkage.

Figure 5:
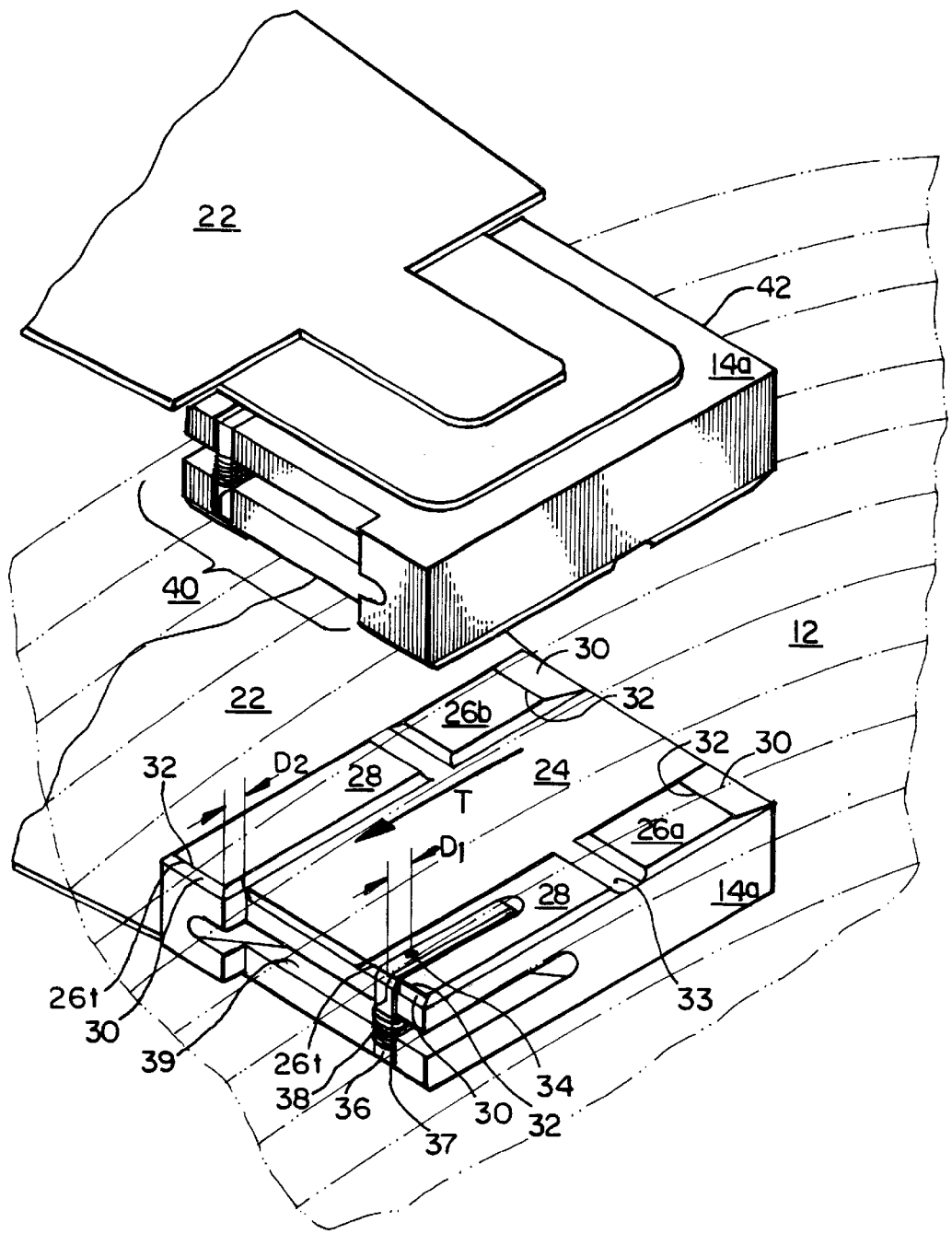
FIG. 5 is an exploded perspective view of a first set of drive heads for use in the storage media drive of FIG. 1 in accordance with one embodiment of the present invention.
Figure 5A:
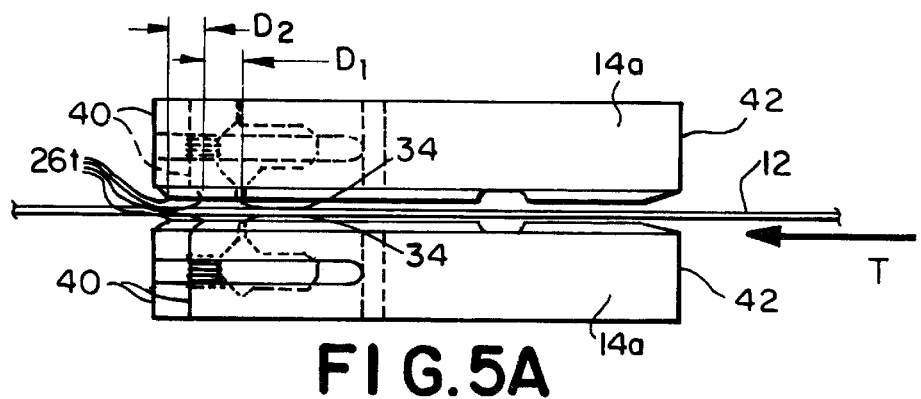
FIGS. 5A and 5B are un-exploded side views of the drive heads of FIG. 5, and show the drive heads in alignment (FIG. 5A) and in mis-alignment (FIG. 5B)

Referring to FIG. 5 now, to allow for the fact that the distance D1 can become quite small, and also to add an extra margin of safety in any circumstance, the present invention extends the trailing termination 26*t* of the second air bearing surface 26*b* in the traveling direction T. In particular, in the present invention, with respect to any drive head 14*a*, the trailing termination 26*t* of the second air bearing surface 26*b* of such drive head 14*a* extends farther a distance D2 in the traveling direction T than the trailing termination 26*t* of the first air-bearing surface 26*a* of such drive head 14*a*.

Figure 5B:
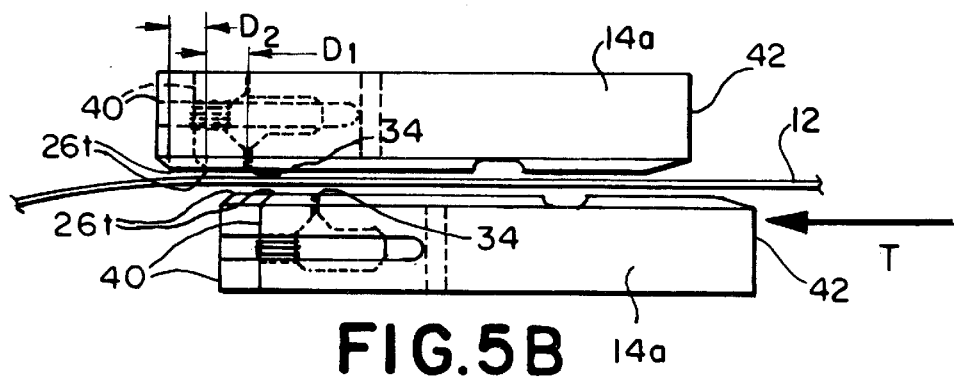

Accordingly, the drive sensor 34 of each drive head 14*a* is still overlaid by the second air-bearing surface 26*b* of the opposite drive head 14*a* when the drive heads 14*a* are aligned with respect to the traveling direction. Moreover, the drive sensor 34 of each drive head 14*a* remains overlaid by the second air-bearing surface 26*b* of the opposite drive head 14*a* when the drive heads 14*a* are mis-aligned with respect to the traveling direction by as much as the sum of D1 and D2. That is, even if the mis-alignment is greater than D1, as is shown in FIG. 5B, the additional margin D2 provided by the extended second air-bearing surface 26*b* allows for an additional amount of acceptable mis-alignment beyond the distance D1. Thus, the sensor 34 in the upper drive head 14*a* remains overlaid by the second air-bearing surface 26*b* of the lower drive head 14*a* even though the upper drive head 14*a* is farther along in the traveling direction than the lower drive head 14*a* by an amount greater than D1. Moreover, in the case where D1 is substantially zero, the additional distance D2 provides for some margin of mis-alignment while still opposing each drive sensor 34 with a respective second air-bearing surface 26*b*.

In the drive heads 14*a* shown in FIG. 5, the sensor face 24 of each drive head 14*a* has a trailing edge 40 that is in actuality a nearer trailing edge 40 adjacent the first air-bearing surface 26*a* and generally perpendicular thereto (a first, less extending portion), and a farther trailing edge 40 adjacent the second air-bearing surface 26*b* and generally perpendicular thereto (a second, more extending portion). That is, such trailing edge 40 is generally discontinues. Accordingly, the drive head 14*a* has a 'Utah' shape, somewhat. As seen in FIG. 5, the discontinuity on the discontinues trailing edge 40 occurs adjacent the second air-bearing surface 26*b*. As should be understood, however, the discontinuity on the trailing edge 40 may occur at any point between the first and second air-bearing surfaces 26*a*, 26*b* without departing from the spirit and scope of the present invention.

Figure 6:
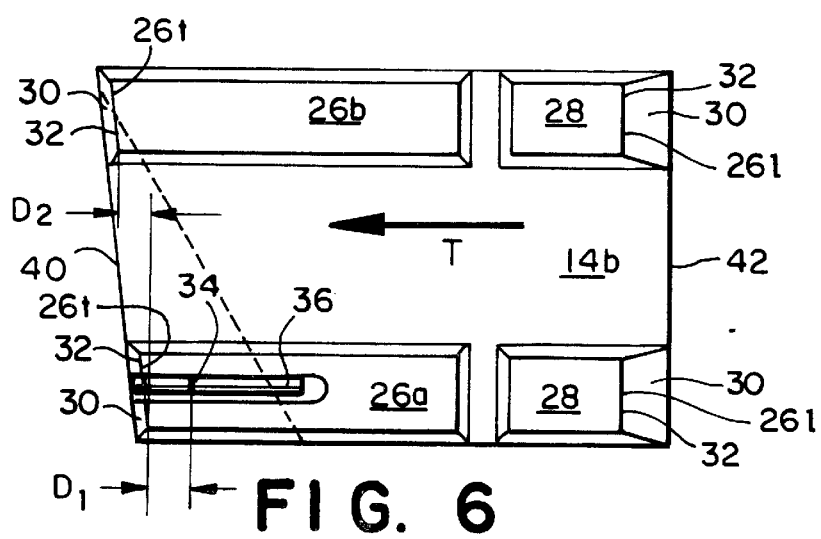
FIGS. 6–8 are top plan views of second, third, and fourth drive heads for use in the storage media drive of FIG. 1 in accordance with other embodiments of the present invention.

Referring now to FIG. 6, another embodiment of the present invention is shown. Here, for the sake of clarity, only one drive head 14*b* is seen, although it is understood that the drive head 14*b* is to be properly overlaid with a like drive head 14*b*. In contrast with the Utah drive head 14*a* of FIG. 5, the drive head 14*b* of FIG. 6 has a generally continuous trailing edge 40 that is angled such that the trailing edge 40 extends farther adjacent the second air-bearing surface 26*b* and nearer adjacent the first air-bearing surface 26*a*. Accordingly, the drive head 14*b* has a 'Nevada' shape, somewhat. As with the Utah drive head 14*a*, the drive sensor 34 of the drive head 14*b* is positioned on the first air bearing surface 26*a* thereof a distance D1 from the trailing termination 26*t* of such first air bearing surface 26*a*. Likewise, the trailing termination 26*t* of the second air-bearing surface 26*b* of the drive head 14*b* extends farther a distance D2 in the traveling direction than the trailing termination 26*t* of the first air-bearing surface 26*a* of such drive head 14*b*. Accordingly, and once again, when the drive head 14*b* is properly overlaid with a generally identical drive head 14*b* (not shown) and when such drive heads 14*b* are mis-aligned with respect to the traveling direction T by as much as the sum of D1 and D2, the drive sensor 34 of each drive head 14*b* remains overlaid by the second air-bearing surface 26*b* of the opposite drive head 14*b*.

Figure 7:
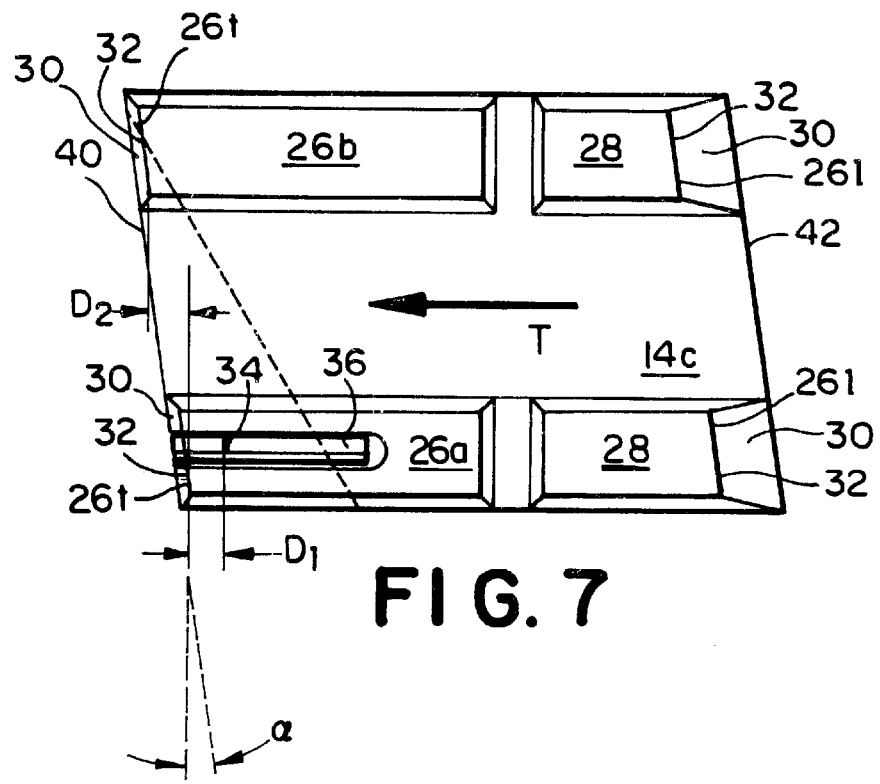

In the embodiment of the present invention shown in FIG. 6, the sensor face 24 of each drive head 14*b* has a leading edge 42 that is generally perpendicular with respect to the first and second air-bearing surfaces 26*a*, 26*b* of such sensor face 24. In another embodiment of the present invention, however, and referring now to FIG. 7, such leading edge 42 of the drive head 14*c* is at an acute angle α with respect to the first and second air-beagring surfaces 26*a*, 26*b*. Preferably, the leading and trailing edges 42, 40 in such drive head 14*c* are generally parallel. As may be understood, the drive head 14*c* of FIG. 7 is substantially functionally identical with the drive heads 14*a*, 14*b* of FIGS. 5 and 6. However, the drive head 14*c* of FIG. 7 is at least marginally more manufacture-friendly. Specifically, multiple drive heads 14*c* may be formed at least initially as one of many drive heads 14*c* organized and machined into a block of material in the form of rows and columns, and may be removed in more-or-less final form by way of a first series of cuts along the air-bearing surfaces 26*a*, 26*b*, and a second series of cuts at the aforementioned acute angle with respect to the air-bearing surfaces 26*a*, 26*b*. In contrast, the drive heads 14*a* and 14*b* in a similar situation would require additional cuts to form the discontinues trailing edge 40 (drive head 14*a*) or to form differently angled leading and trailing edges 42, 40 (drive head 14*b*).

Figure 8:
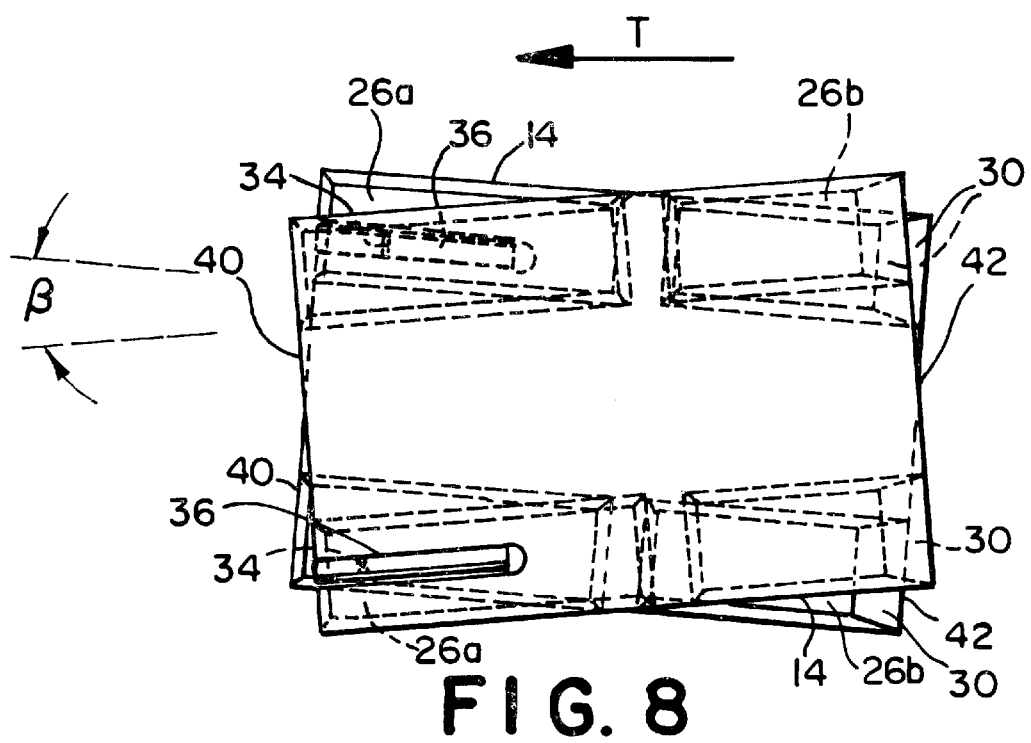

In the prior art and as shown in FIG. 2, a pair of drive heads 14 are oriented with respect to each other such that the air-bearing surfaces 26*a*, 26*b* on one drive head 14 are generally parallel to the air-bearing surfaces 26a, 26b on, the other drive head 14. In another embodiment of the present invention, and as shown in FIG. 8, the same pair of prior art drive heads 14 are employed (although as shown in FIG. 8, the drive sensor 34 on each drive head 14 is on the other rail 30 as compared with FIG. 2). However, and importantly, such drive heads 14 as seen in FIG. 8 are oriented with respect to each other such that the air-bearing surfaces 26a, 26b on one drive head 14 are at an acute angle with respect to the air-bearing surfaces 26a, 26b on the other drive head 14. In one embodiment, the acute angle is about eight degrees or so, although other angles may be employed without departing from the spirit and scope of the present invention. Preferably, each drive head is rotated out of parallel about half the aforementioned acute angle β such that the trailing termination 26t of the second air-bearing surface 26b of the drive head 14 in FIG. 8 extends farther a distance D2 in the traveling direction than the trailing termination 26t of the first air-bearing surface 26a of such drive head 14. Accordingly, and once again, when the rotated drive heads 14 are properly overlaid with respect to each other, and when such drive heads 14 are mis-aligned with respect to the traveling direction T by as much as the sum of D1 and D2 (such D1 and D2 not being shown in FIG. 8 for the sake of clarity), the drive sensor 34 of each rotated drive head 14 remains overlaid by the second air-bearing surface 26b of the opposite rotated drive head 14b. As shown, the drive heads 14 in FIG. 8 are rotated upon an axis (not shown) at about the center of each drive head 14. However, other axis locations may be employed without departing from the spirit and scope of the present invention. For example, in one embodiment (not shown), such axis is at or near the trailing edge 40 of each drive head 14.

As should be appreciated, the rotated drive heads 14 as shown in FIG. 8 have several advantageous features. For one thing, in such drive heads 14, the leading and trailing edges 42, 40 of such drive heads are generally continuous and generally perpendicular to the first and second air-bearing surfaces 26a, 26b. Accordingly, manufacturing is simplified. For another, such drive heads 14 are already proven and trusted. However, care must be taken in rotating such drive heads 14 to ensure that each rotated second air-bearing surface 26b overlays its respective drive sensor 34 in the range of mis-alignment from–(D1+D2) to+(D1+D2). Additionally, care must be taken to ensure that the drive heads 14 are not rotated at too large an angle with respect to the traveling direction T. Otherwise, each leading bevel 30 will not trap air and an air bearing will not be formed thereby.

As should now be understood, in the present invention, an additional margin of acceptable mis-alignment is provided by extending the trailing termination 26t of the second air-bearing surface 26b a further distance D2 in the traveling direction farther than the trailing termination 26t of the first air-bearing surface 26a. As should be recognized, any design that effectuates such additional distance D2 is within the spirit and scope of the present invention. Changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A storage media drive for reading and/or writing a storage media, the drive comprising a pair of opposing drive heads, the storage media being interposed between the drive heads for travel therebetween, each drive head having:

a sensor face including first and second generally parallel longitudinally extending air-bearing surfaces, each air-bearing surface having a leading termination and a generally longitudinally opposing trailing termination, the storage media traveling adjacent the sensor face of the drive head in a traveling direction extending generally along the air-bearing surfaces from the leading terminations to the trailing terminations; and a drive sensor positioned on the first air-bearing surface of the sensor face a distance D1 from the trailing termination of such first air-bearing surface, the trailing termination of the second air-bearing surface of each drive head extending farther a distance D2 in the traveling direction than the trailing termination of the first air-bearing surface of each drive head, the drive heads being opposingly positioned with respect to each other such that the first air-bearing surface of each drive head is generally opposed by the second air-bearing surface of the opposite drive head, such that the leading terminations of the drive heads generally oppose each other, and such that the trailing terminations of the drive heads generally oppose each other, the drive sensor of each drive head being overlaid by the second air-bearing surface of the opposite drive head when the drive heads are aligned with respect to the traveling direction, and the drive sensor of each drive head remaining overlaid by the second air-bearing surface of the opposite drive head when the drive heads are mis-aligned with respect to the traveling direction by as much as the sum of D1 and D2.

2. The drive of claim 1 wherein each air-bearing surface of each sensor face of each drive head comprises a raised rail on such sensor face.

3. The drive of claim 2 wherein each sensor face of each drive head further comprises bevels extending from the raised rails in at least one direction.

4. The drive of claim 3 wherein each bevel interconnects to a respective rail at a blend adjacent a respective termination of such rail.

5. The drive of claim 1 wherein the air-bearing surfaces of one drive head are generally parallel to the air-bearing surfaces of the other drive head.

6. The drive of claim 5 wherein each sensor face of each drive head has a trailing edge toward the traveling direction and a generally opposing leading edge, the trailing edge of each drive head being generally continuous.

7. The drive of claim 5 wherein each sensor face of each drive head has a trailing edge toward the traveling direction and a generally opposing leading edge, the trailing edge of each drive head being generally discontinues.

8. The drive of claim 1 wherein each air-bearing surface has an outboard lateral edge and wherein the lateral edges of the air-bearing surfaces of one drive head are at an acute angle with respect to the lateral edges of the air-bearing surfaces of the other drive head.

9. The drive of claim 8 wherein the lateral edges of the air-bearing surfaces of one drive head are at an acute angle of about 8 degrees with respect to the lateral edges of the air-bearing surfaces of the other drive head.

10. The drive of claim 8 wherein each sensor face of each drive head has a trailing edge toward the traveling direction and a generally opposing leading edge, the leading edge and the trailing edge of each sensor face being generally continuous and generally perpendicular to the lateral edges of the first and second air-bearing surfaces of such sensor face.

11. The drive of claim 1 wherein D1 is substantially zero.

12. The drive of claim 1 wherein each air-bearing surface has an outboard lateral edge and wherein each sensor face of each drive head has a trailing edge toward the traveling direction and a generally opposing leading edge, the trailing edge of each sensor face being at an acute angle with respect to the lateral edges of the first and second air-bearing surface of such sensor face.

13. The drive of claim 12 wherein the leading edge of each sensor face is at an acute angle with respect to the lateral edges of the first and second air-bearing surfaces of such sensor face.

14. The drive of claim 12 wherein the leading and trailing edges of each sensor face are generally parallel.

15. The drive of claim 1 wherein each sensor face of each drive head has a trailing edge toward the traveling direction and a generally opposing leading edge, the trailing edge of each sensor face comprising a first, distinct, less extending portion adjacent the first air-bearing surface and a second, distinct, more extending portion adjacent the second air-bearing surface.

16. A pair of opposing drive heads for being positioned in a storage media drive to read and/or write a storage media positioned therein, the storage media being interposed between the drive heads for travel therebetween, each drive head having:

a sensor face including first and second generally parallel longitudinally extending air-bearing surfaces, each air-bearing surface having a leading termination and a generally longitudinally opposing trailing termination, the storage media traveling adjacent the sensor face of the drive head in a traveling direction extending generally along the air-bearing surfaces from the leading terminations to the trailing terminations; and a drive sensor positioned on the first air-bearing surface of the sensor face a distance D1 from the trailing termination of such first air-bearing surface, the trailing termination of the second air-bearing surface of each drive head extending farther a distance D2 in the traveling direction than the trailing termination of the first air-bearing surface of each drive head, the drive heads being opposingly positioned with respect to each other such that the first air-bearing surface of each drive head is generally opposed by the second air-bearing surface of the opposite drive head, such that the leading terminations of the drive heads generally oppose each other, and such that the trailing terminations of the drive heads generally oppose each other, the drive sensor of each drive head being overlaid by the second air-bearing surface of the opposite drive head when the drive heads are aligned with respect to the traveling direction, and the drive sensor of each drive head remaining overlaid by the second air-bearing surface of the opposite drive head when the drive heads are mis-aligned with respect to the traveling direction by as much as the sum of D1 and D2.

17. The drive heads of claim 16 wherein each air-bearing surface of each sensor face of each drive head comprises a raised rail on such sensor face.

18. The drive heads of claim 17 wherein each sensor face of each drive head further comprises bevels extending from the raised rails in at least one direction.

19. The drive heads of claim 18 wherein each bevel interconnects to a respective rail at a blend adjacent a respective termination of such rail.

20. The drive heads of claim 16 wherein the air-bearing surfaces of one rive head are generally parallel to the air-bearing surfaces of the other drive head.

21. The drive heads of claim 20 wherein each sensor face of each drive head has a trailing edge toward the traveling direction and a generally opposing leading edge, the trailing edge of each drive head being generally continuous.

22. The drive heads of claim 20 wherein each sensor face of each drive head has a trailing edge toward the traveling direction and a generally opposing leading edge, the trailing edge of each drive head being generally discontinues.

23. The drive heads of claim 16 wherein each air-bearing surface has an outboard lateral edge and wherein the lateral edges of the air-bearing surfaces of one drive head are at an acute angle with respect to the lateral edges of the air-bearing surfaces of the other drive head.

24. The drive heads of claim 23 wherein the lateral edges of the air-bearing surfaces of one drive head are at an acute angle of about 8 degrees with respect to the lateral edges of the air-bearing surfaces of the other drive head.

25. The drive heads of claim 23 wherein each sensor face of each drive head has a trailing edge toward the traveling direction and a generally opposing leading edge, the leading edge and the trailing edge of each sensor face being generally continuous and generally perpendicular to the lateral edges of the first and second air-bearing surfaces of such sensor face.

26. The drive heads of claim 16 wherein D1 is substantially zero.

27. The drive heads of claim 16 wherein each air-bearing surface has an outboard lateral edge and wherein each sensor face of each drive head has a trailing edge toward the traveling direction and a generally opposing leading edge, the trailing edge of each sensor face being at an acute angle with respect to the lateral edges of the first and second air-bearing surface of such sensor face.

28. The drive heads of claim 27 wherein the leading edge of each sensor face is at an acute angle with respect to the lateral edges of the first and second air-bearing surfaces of such sensor face.

29. The drive heads of claim 27 wherein the leading and trailing edges of each sensor face are generally parallel.

30. The drive heads of claim 16 wherein each sensor face of each drive head has a trailing edge toward the traveling direction and a generally opposing leading edge, the trailing edge of each sensor face comprising a first, distinct, less extending portion adjacent the first air-bearing surface and a second, distinct, more extending portion adjacent the second air-bearing surface.

* * * * *

UNITED STATES PATENT AND TRADEMARK OFFICE
CERTIFICATE OF CORRECTION

PATENT NO. : 6,487,049 B1 Page 1 of 1
DATED : November 26, 2002
INVENTOR(S) : David Hall It is certified that error appears in the above-identified patent and that said Letters Patent is hereby corrected as shown below:

<u>Title page, Item [54] and Column 1, lines 1 thru 3,</u>
Please delete "DRIVE HEADS FOR STROAGE MEDIA DRIVE WITH DISPLACED PAIR OF SENSORS" and insert therefore -- DRIVE HEADS FOR STORAGE MEDIA DRIVE --;

<u>Column 10,</u>
Line 47, please delete "air-beagring" and insert therefore -- air-bearing --;
Line 62, please delete "discontinues" and insert therefore -- discontinuous --;

<u>Column 11,</u>
Line 9, please delete "acute angle with" and insert therefore -- acute angle β with --;

<u>Column 14,</u>
Line 11, please delete "rive" and insert therefore -- drive --; and
Line 20, please delete "discontinues" and insert therefore -- discontinuous --.

Signed and Sealed this

Ninth Day of September, 2003

JAMES E. ROGAN
*Director of the United States Patent and Trademark Office*